No. 737,378. PATENTED AUG. 25, 1903.
R. O. FAUBION & C. W. & C. G. WORKMAN.
ATTACHMENT FOR CULTIVATORS.
APPLICATION FILED FEB. 2, 1903.
NO MODEL.
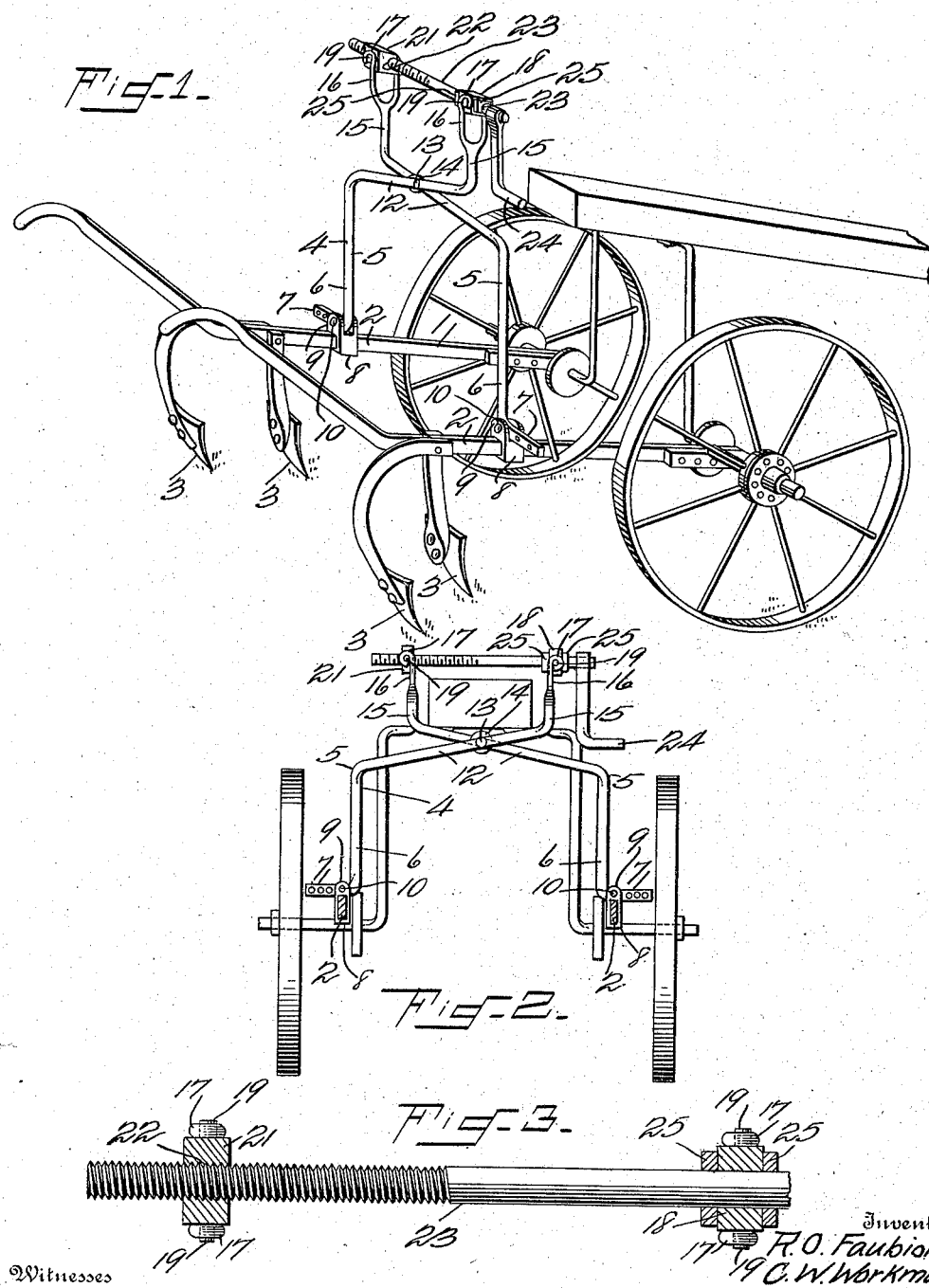
Witnesses
George Hilton
Roy C. Heflebower
Inventors
R. O. Faubion,
C. W. Workman,
and C. G. Workman.
By H. B. Willson
Attorney

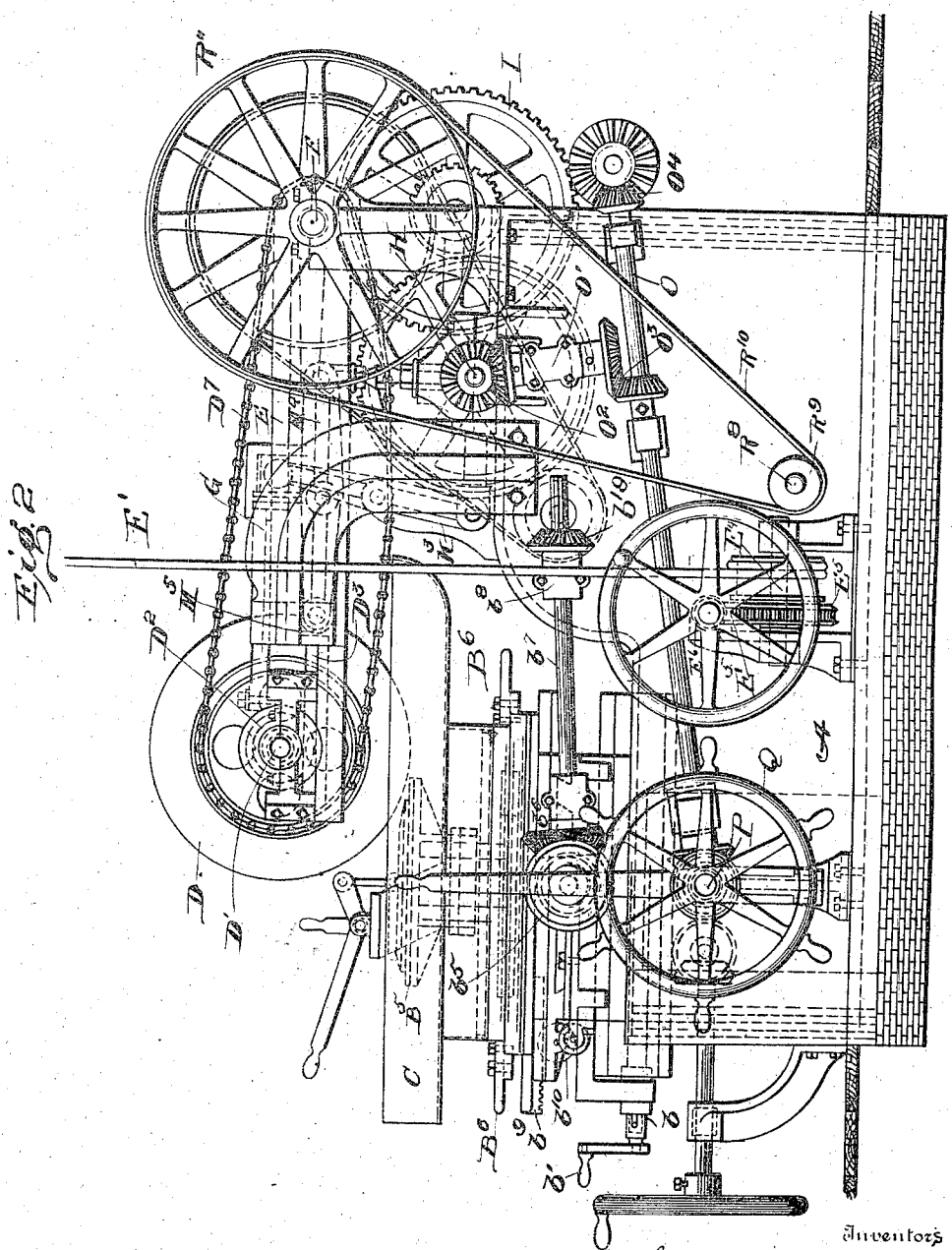

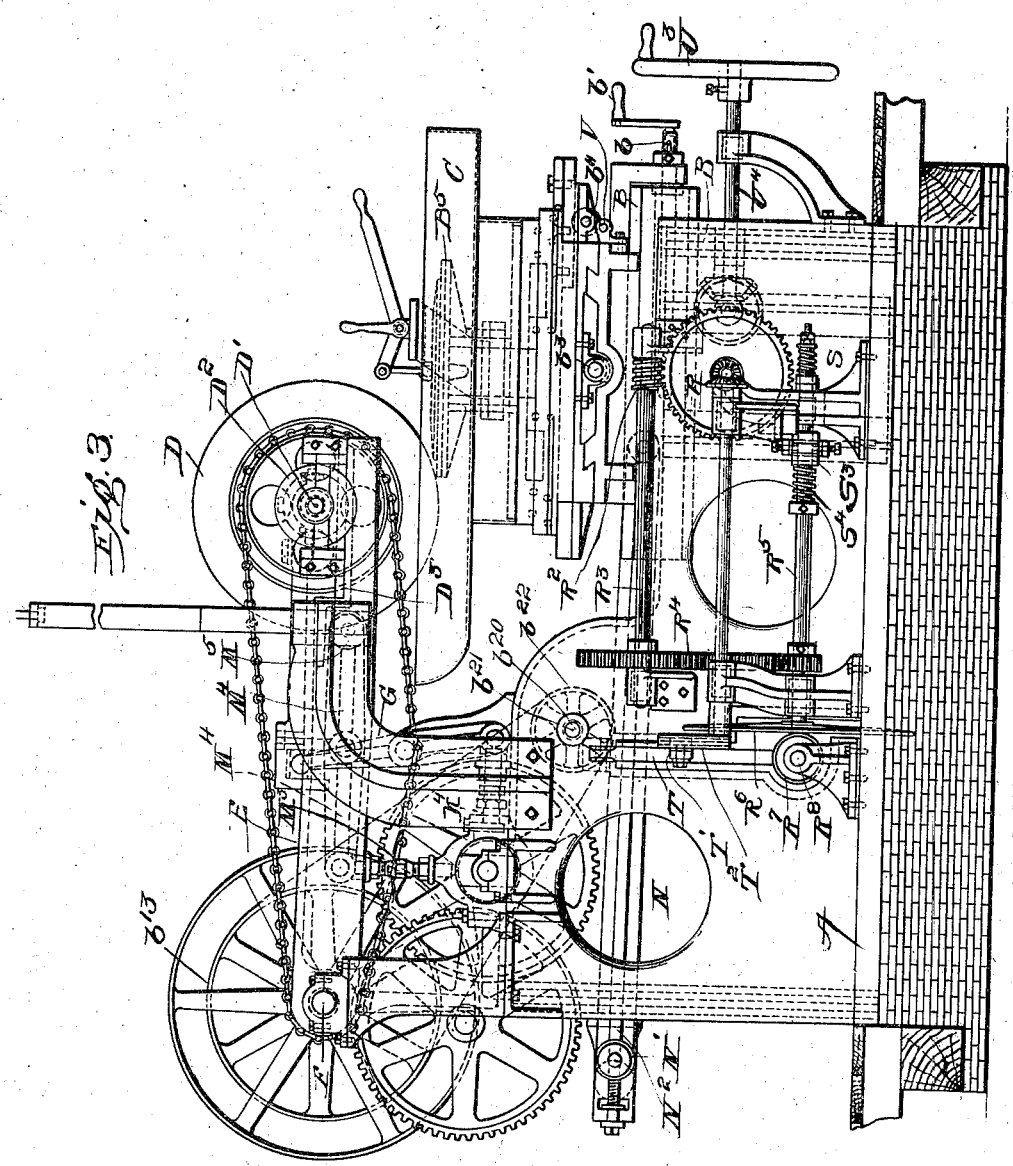

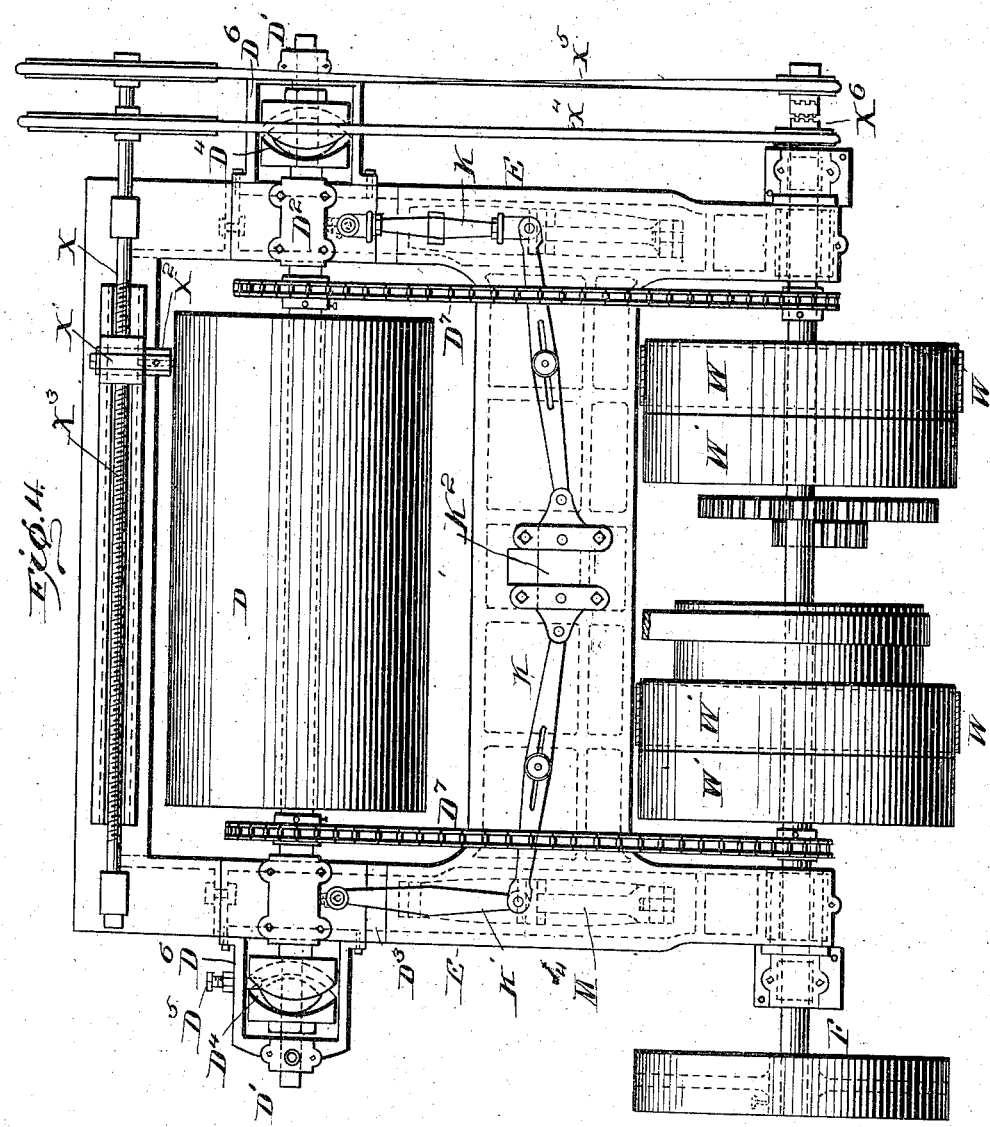

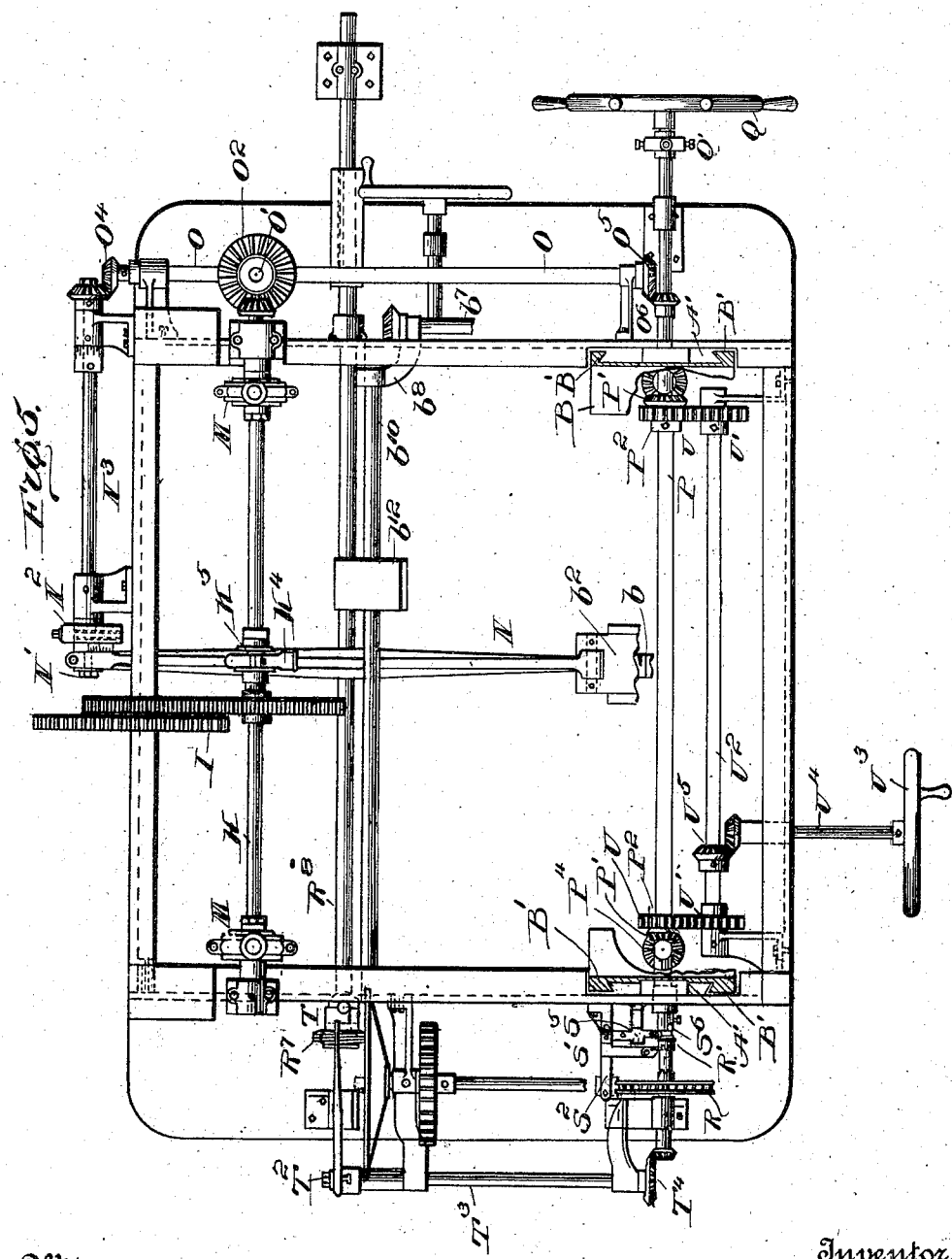

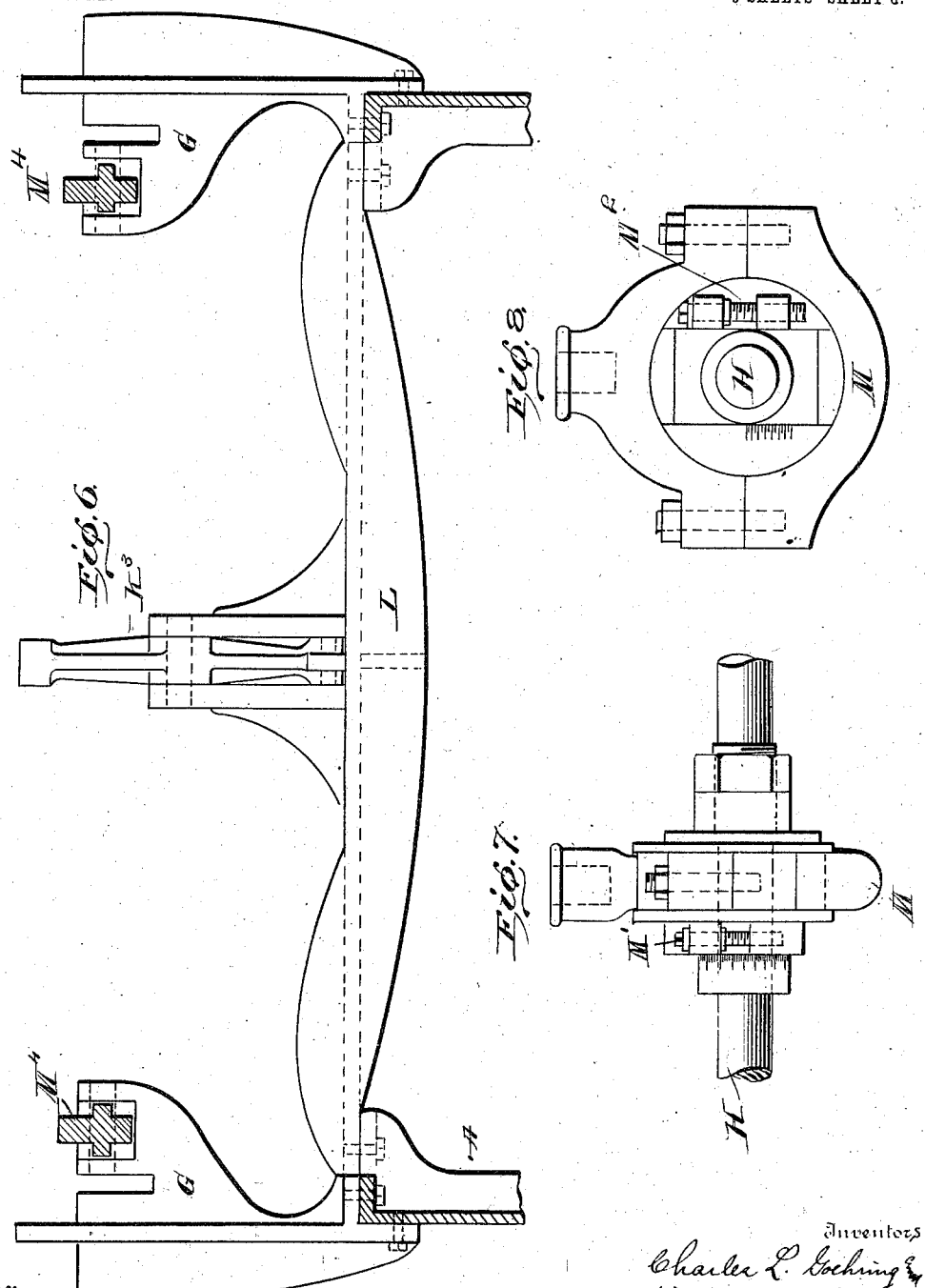

No. 737,389.

Patented August 25, 1903.

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-BEVELING MACHINE.

SPECIFICATION forming part of Letters Patent No. 737,389, dated August 25, 1903.

Application filed March 28, 1903. Serial No. 150,021. (No model.)

*To all whom it may concern:*

Be it known that we, CHARLES L. GOEHRING and WILLIAM TROCHE, of Akron, in the county of Summit, State of Ohio, have invented certain new and useful Improvements in Glass-Beveling Machines; and we do hereby declare the following to be a full, clear, and exact description of the same, reference being had to the accompanying drawings, forming a part of this specification, and to the letters of reference marked thereon.

This invention relates to that class of machinery designed for forming bevels or inclines on glass plates and other objects of frangible material. The class to which the present apparatus belongs is well exemplified by the machine illustrated in our contemporaneous application, Serial No. 110,660, filed June 7, 1902, as a continuation of application, Serial No. 48,342, filed February 21, 1901; and the objects of the present invention are to improve the general arrangement and construction of the mechanism, whereby the work may be performed expeditiously, a greater variety of work performed with a single machine, and the resultant product present a flat as contradistinguished from a concave bevel.

The invention consists in certain novel details of construction and combinations and arrangements of parts, all as will be now described, and pointed out particularly in the appended claims.

Referring to the accompanying drawings, Figure 1 is a front elevation of a machine embodying the present improvements, portions being broken away. Fig. 2 is a side elevation looking at the right-hand side of the machine. Fig. 3 is a similar view looking at the opposite side of the machine. Fig. 4 is a top plan view of the grinder or stone with its frame and driving mechanism. Fig. 5 is a top plan view of the driving mechanism for the table or work-support. Fig. 6 is a sectional elevation showing the cross-frame and side guides for the grinder-frame, with certain parts of the mechanism for controlling said frame. Figs. 7 and 8 are elevations of one of the adjustable eccentrics, showing the means for adjusting the throw and angular position of the same.

Like letters of reference in the several figures indicate the same parts.

The letter A indicates the main frame of the machine, and B a primary work-table mounted in the main frame to move vertically through the medium of slides $B'$ and guides $A'$ at each side, Figs. 1 and 5. The primary table B supports secondary tables $B^2$ $B^3$ $B^4$, the table $B^3$ being mounted in slideways on the table $B^2$ to move transversely, while the tables $B^2$ and $B^4$ are mounted in slideways on the table B and $B^3$, respectively, to slide forwardly and backwardly. The table $B^2$ is adjusted on the table B by means of a screw $b$, controlled manually by a handle $b'$ and coöperating with a nut $b^2$, held by a mechanism to be presently described and sometimes employed to give a periodic movement to the said table, as will be presently described. The table $B^3$ is adapted to be moved, adjusted, or reciprocated from side to side by a screw $b^3$, journaled on the table $B^2$ and having at the end reverse miter-gears $b^4$ $b^5$, adapted to be clutched to the shaft by a reversing mechanism, said miter-gears being in mesh with a gear $b^6$ on the forward end of a shaft $b^7$, extending back and journaled at its rear end in a swinging bearing $b^8$, Figs. 2 and 5. Table $B^4$ is adjusted manually by a rack and pinion $b^9$ $b^{10}$, the pinion being mounted on a shaft $b^{11}$, Fig. 3, extending out to one side of the table and adapted for the application of a handle thereto.

On the table $B^4$ there is mounted a rotary support $B^5$, upon which the work or glass to be beveled is placed, the support being made rotary primarily to facilitate the turning of the plate for presenting different edges to the grinder or stone, and it may be turned by handles $B^6$ and locked by any approved locking devices.

Surrounding the support $B^5$ is a tank or water-pan C, having a central stuffing-box through which the stem of the support passes, whereby said support may be rotated without turning the tank. Said tank is preferably made of sufficient size to receive a plate of the largest size the machine will handle and is of such depth that the glass may be completely submerged during the grinding of the bevel.

The grinder or stone is indicated by the letter D, and, as shown, it is cylindrical. It is of a length not less than the length of the edge to be beveled and is preferably of somewhat greater length in order that the whole length of edge may be acted on simultaneously and uniformly. This grinder or stone is carried by a grinder-frame E, pivotally mounted at the rear end on an axis coincident with the axis of a drive-shaft F, whereby the frame and stone may be raised and lowered either by the driving mechanism in the operation of the machine or manually for permitting of the insertion, removal, or turning of the glass. For raising and lowering the frame manually a cable E', connected with the frame by a yoke $E^2$ and passing over pulleys $E^3$ to a windlass $E^4$, is employed. By turning the windlass the frame and stone may be raised or lowered, and as said windlass preferably embodies a worm-wheel and screw $E^5$ the frame will be held or supported in any position to which it may be adjusted. In normal position ready for operation the frame is in its lowermost position, in which position it is guided and supported by side arms G, extending upwardly from the main frame, as shown clearly in Figs. 2, 3, and 6. While the grinder or stone is supported by the frame E, it is nevertheless bodily movable independently thereof both longitudinally and transversely of its axis, such movements being made possible by journaling the shaft D', carrying the stone, in bearings $D^2$, mounted to slide in ways $D^3$ on the frame. The shaft may both rotate and move longitudinally in its bearings, and the latter movement is preferably dependent upon the former, being secured by mounting hubs having cam-grooves $D^4$ therein on the ends of the shaft and providing screws $D^5$, carried by housings $D^6$ on the frame, for coöperation therewith. The shaft and stone are rotated by sprocket-wheels located on the shaft D' and drive-shaft F, respectively, and connected by sprocket-chains $D^7$, which will permit of the aforesaid limited movements of the stone. The transverse bodily movements are imparted through driving connections with a counter-shaft H, rotated by a train of gearing I from the main drive-shaft F, such driving connections being as follows: Lever-arms K, Fig. 4, are pivoted on the frame E and connected at their outer ends by links K' with the bearings $D^2$, while at their inner ends they are jointed to a slide $K^2$, having a socket in the under side for the reception of the rounded upper end of a vertical lever $K^3$, Figs. 6, 2, and 3, journaled centrally on a cross-frame L. At its lower end the lever $K^3$ is connected by an adjustable rod $K^4$ with an eccentric-strap surrounding an adjustable eccentric $K^5$ on the shaft H. Two other eccentrics corresponding to the eccentric $K^5$ are located on the shaft H, said eccentrics being lettered M Fig. 5, and are located at each end of the shaft and are for the purpose of giving a periodic vertical movement to the stone and frame E, as will be presently described. All of these eccentrics correspond in construction and mode of adjustment with the construction illustrated in Figs. 8 and 7. From these figures it will be seen that the angular position of the eccentric may be adjusted by a screw M', through which it is connected with the shaft, and its throw may be adjusted by a screw $M^2$, through which the two parts of the eccentric are connected together, as is common in the arts, and whereby the eccentric may, if desired, be set on a dead-center or so as to have no throw, in which position it will be inoperative. The eccentrics M are surrounded by straps connected by adjustable rods $M^3$, Figs. 1, 2, and 3, with the rear ends of levers $M^4$, Figs. 2, 3, and 6, pivoted on the side arms G and at their forward ends bearing rollers $M^5$, underlying the sides of the stone-frame and adapted to give said frame and stone a periodic up-and-down movement, and such movement may be made to synchronize with the back-and-forth movement of the stone, thereby giving a resultant diagonal movement in the plane of the bevel being formed. By changing the angular position of the eccentrics the movement of the stone may be made to correspond to any desired inclination of bevel desired. The transverse movements of the stone may be entirely arrested either by setting the eccentrics centrally of the shaft or by throwing one of the gears of the train of gearing I out of mesh, as by moving a gear-wheel longitudinally on its shaft.

It is for some purposes or classes of work desirable to move the work or glass rather than the stone or to move the work in one direction and the stone in another direction to secure a transverse movement in the plane of the bevel, and the present machine embodies a structure wherewith the most advantageous movements for the work in hand may be employed. The work may be moved back and forth toward and from the stone and the stone simply raised and lowered, or the vertical and back-and-forth movement of the work may be combined and the stone held against transverse movement, and all of the mechanism for accomplishing these movements is driven from the main drive-shaft F; but the connections for moving the work toward and from the stone and vertically are preferably such that each may be capable of individual adjustment. For moving the work toward and from the stone the slide-nut $b^2$, before referred to and with which the screw $b$ engages, is connected by a connecting-rod N with a crank N', adjustable by means of screw $N^2$ on a shaft $N^3$, deriving its motion from the shaft H through the medium of a side shaft O, a short shaft O', and connecting bevel-gears $O^2$ $O^3$ $O^4$. The crank N' may be set at the center, in which case it will hold the slide-nut in fixed position, or it may be given any desired throw to move the work toward and from the stone to the desired extent. The shaft O may be utilized to effect a vertical movement or to synchronize the horizontal and vertical movement of the work through a connection with the table-controlling shaft P. The connection referred to is formed through a pair of bevel-gears $O^5$, one of which may be made fast by a set-screw $O^6$, working in a groove in the controlling-shaft P, so as to permit the shaft to slide longitudinally and at the same time be readily detached should it be desired to elevate the table manually or by other mechanism to be now described.

The shaft O forms a driving connection between the table-controlling shaft P and crank-shaft $N^3$. Thus if the gears $O^2$ $O^3$ be thrown out of action, as by loosening them on their shafts by backing off the set-screws, the rotation of the shaft P will cause a rotation of the crank, thereby moving the work toward or from the stone or grinder.

The table-controlling shaft P carries a pair of bevel-gears P', capable of being secured to rotate therewith, while permitting the shaft to move longitudinally, as by set-screws $P^2$, working in keyways in the shaft. Said gears are held against longitudinal movement with the shaft by brackets $P^3$ on the main frame, and they mesh with gear-wheels $P^4$ on the upper ends of screw-shafts $P^5$, journaled in the main frame and having nuts $P^6$ working thereon, said nuts forming part of or being connected with the slides B', upon the upper ends of which the primary table $B^2$ is mounted. Shaft P is provided with a hand-wheel Q, by means of which it may be rotated manually, and it is also provided with a shifting-lever Q', by means of which it may be shifted longitudinally to throw in an automatic differential feed, whereby the work may be automatically fed rapidly during the initial grinding, slowly during the final grinding, and finally the feed entirely arrested in completing the operation. This automatic differential-feed mechanism is in the machine illustrated connected with the left-hand portion of the shaft P and corresponds in construction and operation with the mechanism illustrated in the before-mentioned application with certain minor differences in details of construction, as will presently appear.

Located on the shaft P is a worm-wheel R, free to rotate independently of the shaft, but adapted to be coupled therewith by a clutch, one section R' of which is fast on the shaft and is moved into engagement by the aforesaid longitudinal movement of the shaft. The worm-wheel R is driven by a worm $R^2$ on a shaft $R^3$, rotated by a train of gears $R^4$, deriving motion from a shaft $R^5$, having at its rear end a friction-disk $R^6$, against which bears a friction-wheel $R^7$, rotated by a shaft $R^8$, but free to slide longitudinally thereof, so as to engage the disk at a point more or less remote from its center, and thereby drive said disk fast or slow, as desired. Shaft $R^8$ receives its motion through a pulley $R^9$ and belt $R^{10}$, passing over a pulley $R^{11}$ on the main drive-shaft, as shown in Fig. 2.

The shaft $R^5$, carrying the friction-disk $R^6$, is capable of a limited longitudinal movement. In its normal position it is held by a spring S in such position that the disk is out of engagement with the friction-wheel; but when the shaft P is moved longitudinally the clutch R' or an enlargement or collar moving therewith engages a pivoted gate S' and moves the same on its center. One arm $S^2$ of the gate, Fig. 5, engaging the collar $S^3$, Figs. 3 and 5, moves the shaft $R^5$ longitudinally, throwing the disk up against the friction-wheel. A spring $S^4$ is preferably interposed between the collar $S^3$ and shaft, whereby the disk is held against the wheel with an elastic pressure, and the gate may move or swing beyond its normal position to allow the collar on the shaft P to pass. When the collar or clutch moves the gate, as described, a dog or catch $S^5$, Fig. 5, swings in behind the gate and holds it in place, and to arrest the feed it is only necessary to release the dog or catch, when the spring S will assert itself and move the disk out of engagement with the friction-wheel. To release the dog, an adjustable projection $S^6$ is mounted on the shaft P and so located as to engage said dog and release it at a predetermined point in the rotation of the shaft. This dog and its operating mechanism are similar to that described in the before-mentioned applications. The shifting of the friction-wheel toward and from the center of the disk is also effected automatically by the movement of the shaft P. This is accomplished by providing a shifter-arm T for said wheel, the arm being pivoted at the upper end and connected at an intermediate point by a connecting-rod T' with an adjustable crank $T^2$ on the end of a shaft $T^3$, in gear with the shaft P through bevel-gears $T^4$. As the shaft P is rotated to elevate the work it will gradually shift the friction-wheel toward the periphery of the disk, thereby gradually reducing the speed until at the final movement the gate is released by the tripping of the dog, and the feed is entirely arrested.

In order to enable the vertical adjustment of the table and work to be manually controlled even should the gears P' be released from the shaft P by unscrewing the screws $P^2$, the said gears P' are provided with other gear-wheels U, meshing with gears U' on a shaft $U^2$, and the shaft $U^2$ is adapted to be rotated by a hand-wheel $U^3$ on a shaft $U^4$ and connected with the shaft $U^2$ by bevel-gears $U^5$.

The cross-feed of the carriage $B^3$, as before explained, is obtained by the use of a screw $b^3$, adapted to be rotated in one direction or the other by gears $b^4$ $b^5$, meshing with gear $b^6$ on shaft $b^7$. The shaft $b^7$ is rotated through the medium of a pair of gear-wheels $b^{19}$, connecting the shaft $b^7$ with a cross-shaft $b^{20}$, and the latter is rotated by a belt $b^{21}$, running over pulleys $b^{22}$ $b^{13}$ on the shaft $b^{10}$ and main drive-shaft, respectively. For controlling the transverse movement of the carriage $B^3$ a shifter-rod V is mounted on the carriage $B^2$ at the front, and one end of this rod engages a clutch-section V', mounted on the screw $b^3$ and adapted when shifted in one direction or the other to clutch one or the other of the gears $b^4$ $b^5$ with said shaft. The shifter-rod is provided with projections adapted to be engaged by the carriage $B^3$ or a projection moving therewith, so as to effect an automatic shifting of the clutch-section. The projection on the carriage is lettered $V^2$, and for coöperation therewith adjustable buttons or arms $V^3$ are mounted on the rod. There are preferably four of the projections or arms on the rod, two of which are operative when the rod is in one angular position of adjustment and the other two of which are operative when the rod is in another angular position of adjustment, whereby provision is made for automatic operation on rectangular plates having long and short sides. The angular position of the rod may be changed by a handle $V^4$ at its right-hand end. In operation when the work is turned to present a long or a short edge to the stone the handle $V^4$ may be grasped and the shifter-rod given a partial rotation to bring the proper projections into the path of the projection $V^2$ on the carriage. The stone or grinder may be driven in either direction, but is preferably rotated toward the edge of the work, and the power for rotating the main drive-shaft may be imparted through belts W W, running over fast and loose pulleys W' on said drive-shaft, or any other drive-gearing of usual type may be employed.

With the mechanism described it will be noted that the work or the stone may be moved or the movements of the work and stone combined to produce a movement of the grinding-point transversely of the axis of the stone and in the plane of the bevel, so as to produce a flat as contradistinguished from a concave bevel; but in every instance there is preferably combined therewith a movement of the stone and work with relation to each other in the plane of the bevel, but longitudinally of the axis of the stone, whereby the resultant action at the grinding-point is an irregular or diagonal cut, which will give a smooth finish or at least prevent the formation of deep scratches or ridges from the successive action of the same portion of the stone on the same portion of the bevel. In operation the whole length of the bevel is acted on simultaneously, and the whole of the plate is kept immersed beneath the surface of a body of water, under which conditions it is found that not only is the percentage of breakage greatly reduced, but the grinding may be forced, particularly during the initial part of the work, without danger of chipping the edge or breaking the plate, and owing to this fact there results a great saving of time. The length of the stone and its movements are preferably such as that the surface of the stone is uniformly acted on, and the wear is therefore practically regular; but in case there should be uneven wear due to any cause or irregular spots develop in the stone provision is made for redressing the surface of the stone without removing it from the machine. The mechanism for accomplishing this end is shown in Fig. 4 and consists of a frame X, adapted to be secured to the frame E in front of the stone and having slideways for a slide or carriage X', carrying a diamond or cutting-tool $X^2$. The carriage is driven parallel with the axis of the stone by a screw-shaft $X^3$. The shaft receives its motion from the main drive-shaft F through direct and crossed belts $X^4$ $X^5$, running over pulleys on the two shafts, the pulleys on the drive-shaft preferably being loose, but adapted to be clutched thereto by a clutch-section $X^6$, which may be shifted manually to reverse the movement of the carriage and dressing-tool.

Having thus described our invention, what we claim as new, and desire to secure by Letters Patent, is—

1. In a glass-beveling machine, the combination with a rotary cylindrical grinder, and driving mechanism therefor, of a work-support mounted in ways to move horizontally and vertically in planes parallel with the axis of the grinder and at right angles to each other and a driving mechanism coöperating with said work-support to simultaneously effect said movements whereby the work is moved in a plane parallel with the plane of the bevel and a flat as contradistinguished from a concave bevel is produced; substantially as described.

2. In a glass-beveling machine such as described, the combination with the cylindrical grinder, of a work-support carriage mounted in ways on a primary carriage to move horizontally toward and from the grinder, a primary carriage mounted in ways to move vertically, a drive-shaft and independent connections between said drive-shaft and carriages for moving the same simultaneously; substantially as described.

3. In a glass-beveling machine such as described, the combination with the grinder movable bodily in a plane at right angles to its axis, a drive-shaft and connections therewith for rotating and moving the grinder bodily as described, of a work-holder, a carriage on which the work-holder is mounted movable in a plane at right angles to the axis of the grinder and driving connections between said carriage and drive-shaft for moving the carriage; substantially as described.

4. In a glass-beveling machine, the combination with the rotary grinder movable bodily in a plane at right angles to its axis and a driving-shaft with driving connections for rotating and moving the grinder bodily, of a work-holder carriage mounted in ways to move toward and from the grinder, a crank rotated by the drive-shaft and a connecting-rod between said shaft and carriage; substantially as described.

5. In a glass-beveling machine, the combination with the rotary grinder movable bodily in a plane at right angles to its axis, and a driving-shaft with driving connections for rotating and moving the grinder bodily, of a work-holder carriage mounted in ways to move toward and from the grinder, an adjustable crank rotated by the drive-shaft and a connecting-rod between said shaft and carriage; substantially as described.

6. In a glass-beveling machine the combination with the work-support, the rotary grinder, the pivoted grinder-frame and the bearings in which the grinder is journaled movable toward and from the axis of the frame, of an eccentric-shaft, eccentrics thereon and connections between said eccentrics and grinder-frame and bearings in which the grinder is journaled whereby the grinder may be moved bodily in vertical or horizontal direction; substantially as described.

7. In a glass-beveling machine, the combination with a work-support, a pivoted grinder-frame, bearings movably supported on said frame and a grinder journaled in said bearings, of an eccentric-shaft, vertical and horizontal lever-arms coöperating with the said bearings and frame respectively for moving the same at right angles to the axis of the grinder, and eccentrics on said shaft with connections between the eccentrics and lever-arms; substantially as described.

8. In a glass-beveling machine, the combination with a work-support, a pivoted grinder-frame, bearings movably supported on said frame, a grinder journaled in said bearings and a slide connected with said bearings, of a lever coöperating with said slide and an eccentric for reciprocating said lever, whereby the grinder may be given a bodily movement and the frame swung on its pivots; substantially as described.

9. In a glass-beveling machine, the combination with a work-support, a pivoted grinder-frame, bearings movably mounted on said frame, a grinder journaled in said bearings, and an eccentric with connections between said eccentric and bearings for moving the latter, of side arms constituting guides for the grinder-frame, levers pivoted on said side arms and coöperating with the frame to elevate said frame and grinder and eccentrics with connections between the eccentrics and levers; substantially as described.

10. In a glass-beveling machine, the combination with a rotary grinder, a vertically-movable frame in which the grinder is mounted and driving mechanism for moving said frame vertically, of a work-support movable toward and from the grinder, a manually-controlled screw for adjusting the position of the work-support, a slide-nut with which the screw engages, a driven crank and a connection between said crank and slide-nut whereby the work-support may be manually adjusted and also given a periodic reciprocation in the same direction; substantially as described.

11. In a glass-beveling machine the combination with a cylindrical rotary grinder and a support for presenting an edge of the work to the grinder parallel with the axis of the grinder, of a vertically-movable primary carriage, a horizontally-movable secondary carriage mounted on the primary carriage and which in turn carries the work-support and gearing connecting said primary and secondary carriages whereby the ratio of movement of said carriages may be maintained and a driving mechanism for moving said carriages; substantially as described.

12. In a glass-beveling machine, the combination with the cylindrical rotary grinder and the support for presenting an edge of the work to the grinder parallel with the axis of the grinder, of a carriage for said support movable horizontally toward and from the grinder, a crank-shaft for moving said carriage horizontally and a differential drive-gear for said crank-shaft whereby the work may be advanced toward the grinder at a differential speed; substantially as described.

13. In a glass-beveling machine, the combination with the cylindrical rotary grinder and the support for presenting an edge of the work to the grinder parallel with the axis of the grinder, of a vertically-movable primary carriage, a horizontally-movable secondary carriage mounted on the primary carriage and on which the support is mounted, a carriage drive-shaft, gearing between said drive-shaft and the primary and secondary carriages and a differential driving mechanism for said shaft, whereby the carriages may be advanced at differential speed; substantially as described.

14. In a glass-beveling machine, the combination with a cylindrical rotary grinder and a support for presenting an edge of the work to the grinder parallel with the axis of the grinder, of a vertically-movable primary carriage, a secondary carriage mounted to reciprocate thereon horizontally and in direction parallel with the axis of the grinder, a third carriage mounted on said secondary carriage to move toward and from the grinder and on which the support is mounted, a drive-shaft and gearing intermediate said drive-shaft and said carriages whereby all of said carriages may be simultaneously moved in presenting the work to the grinder; substantially as described.

15. In a glass-beveling machine, the combination with the cylindrical rotary grinder, and work-support, of the vertically-movable primary carriage, a secondary reciprocatory carriage mounted thereon and movable parallel with the axis of the grinder, an elevating mechanism for the primary carriage and a driving mechanism for the secondary carriage embodying reversing-gearing and an operating-shaft journaled in a pivotal bearing whereby the driving connection is maintained regardless of the adjustment of the primary carriage; substantially as described.

16. In a glass-grinding machine, the combination with the cylindrical rotary grinder and work-support, of a primary carriage movable in a vertical plane, a secondary carriage mounted thereon and movable in a horizontal plane, a third carriage mounted on the second and movable at right angles to the movement thereof, a common drive-gear for the primary and one of said secondary carriages and an independent drive-gear for the other one of said secondary carriages embodying a reversing mechanism; substantially as described.

17. In a glass-beveling machine, the combination with the grinder and work-support adapted to be rotated to present different edges of the work to the grinder, of a carriage for said support movable horizontally parallel with the axis of the grinder, a driving mechanism for reciprocating said carriage, a reversing-gear in said driving mechanism and a controlling-rod therefor having pairs of projections thereon with which the carriage co-operates to shift the rod, said pairs of projections being arranged in different angular positions on the rod whereby by giving said rod a partial rotation one or the other of said pairs of projections may be moved into operative position to give a carriage movement corresponding to the length of the edge being operated upon; substantially as described.

CHARLES L. GOEHRING.
WILLIAM TROCHE.

Witnesses:
H. S. FALOR,
PHOEBE FALOR.